US010851734B2

(12) United States Patent
Beasman et al.

(10) Patent No.: US 10,851,734 B2
(45) Date of Patent: Dec. 1, 2020

(54) THRUST REVERSER ASSEMBLY (71) Applicant: MRA Systems, LLC, Baltimore, MD (US)

(72) Inventors: Timothy Robert Beasman, Baldwin, MD (US); Andrew Michael Roach, Aberdeen, MD (US); Graham Frank Howarth, Middletown, DE (US)

(73) Assignee: MRA SYSTEMS, LLC., Baltimore, MD (US)

( * ) Notice: Subject to any disclaimer, the term of this patent is extended or adjusted under 35 U.S.C. 154(b) by 58 days.

(21) Appl. No.: 15/758,733

(22) PCT Filed: Sep. 9, 2015

(86) PCT No.: PCT/US2015/049102
§ 371 (c)(1),
(2) Date: Mar. 9, 2018

(87) PCT Pub. No.: WO2017/044081
PCT Pub. Date: Mar. 16, 2017

(65) Prior Publication Data
US 2019/0032600 A1    Jan. 31, 2019

(51) Int. Cl.
*F02K 1/72* (2006.01)
(52) U.S. Cl.
CPC .......... *F02K 1/72* (2013.01); *F05D 2220/323* (2013.01); *F05D 2240/129* (2013.01); *F05D 2260/30* (2013.01); *Y02T 50/672* (2013.01)
(58) Field of Classification Search
CPC ... F02K 1/72; F02K 1/625; F02K 1/70; F02K 1/62; F02K 1/766; F02K 1/80; F02K 1/805
See application file for complete search history.

(56) References Cited

U.S. PATENT DOCUMENTS 3,475,913 A    11/1969    Mortlock et al.
3,779,010 A *  12/1973    Chamay ................ F02K 1/09
                                                       60/226.2
(Continued)

FOREIGN PATENT DOCUMENTS

EP    2 562 405 A1    2/2013
FR    2379705    *    2/1977    ............... F02K 1/72
(Continued)

OTHER PUBLICATIONS

International Search Report and Written Opinion issued in connection with corresponding PCT Application No. PCT/US2015/049102 dated May 27, 2016.
(Continued)

*Primary Examiner* — Andrew H Nguyen
(74) *Attorney, Agent, or Firm* — Xsensus LLP (57) ABSTRACT

A thrust reverser assembly for high-bypass turbofan engine. The thrust reverser assembly includes a translating cowl mounted to a nacelle of an engine. The thrust reverser assembly includes blocker doors axially guided adjacent first ends thereof by a fixed structure and pivotally and slidably connected along lengths thereof to an inner wall of the translating cowl so that translation of the translating cowl in the aft direction causes the blocker door to move from a stowed position to a deployed position. The thrust reverser assembly includes a stop disposed on the core engine or on the blocker door, receiving the load from the high pressure airflow, otherwise borne by an actuation system when deploying the translating cowl and blocker door.

18 Claims, 5 Drawing Sheets

(56) References Cited

U.S. PATENT DOCUMENTS

| | | | |
|---|---|---|---|
| 4,026,105 A | 5/1977 | James | |
| 4,145,877 A | 3/1979 | Montgomery | |
| 5,255,510 A | 10/1993 | Lardellier | |
| 5,913,476 A | 6/1999 | Gonidec et al. | |
| 8,904,751 B2 | 12/2014 | Howarth et al. | |
| 2005/0160718 A1* | 7/2005 | Osman | F02K 1/60 60/226.2 |
| 2010/0132332 A1* | 6/2010 | Vauchel | F02K 1/72 60/226.2 |
| 2015/0204272 A1* | 7/2015 | James | F02K 1/72 239/265.19 |
| 2016/0363097 A1* | 12/2016 | Foutch | F02K 1/72 |
| 2017/0260928 A1* | 9/2017 | Crawford | F02K 1/763 |

FOREIGN PATENT DOCUMENTS

| | | |
|---|---|---|
| FR | 2 358 555 A1 | 2/1978 |
| JP | H09170496 A | 6/1997 |
| JP | 2013231432 A | 11/2013 |
| WO | 2015/028735 A1 | 3/2015 |

OTHER PUBLICATIONS

International Preliminary Report on Patentability issued in connection with corresponding PCT Application No. PCT/US2015/049102 dated Mar. 13, 2018.

Japanese Patent Office; First Office Action in Application No. 2018511630; dated Jun. 25, 2019; 4 pages.

European Communication Pursuant to Article 94(3) dated Apr. 14, 2020 in European Application No. 15831186.0.

* cited by examiner

THRUST REVERSER ASSEMBLY

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Thrust reverser assemblies are used within turbine engines to provide a reverse thrust, for example, for deceleration. Reverse thrust is typically achieved by deploying a door assembly into a bypass duct which diverts air from an aft direction to forward direction. The door assembly is deployed with an actuation assembly by moving a translating cowl to release the door into the bypass duct. Thus, the blocker door and thrust reverser assembly are subject to a high pressure airflow moving through the bypass duct, which requires a stronger, and often heavier, actuation system to support the high pressure airflow against the door without damaging the thrust reverser or actuation assemblies.

In order to accommodate the high pressure airflow against the blocker door during deployment, a larger actuation system is required to prevent damage. The larger actuation system consumes additional space in the engine and adds weight to the system. Thus, there is a need for a blocker door implementation which uses a smaller actuation system and reduces weight added to the engine.

BRIEF DESCRIPTION OF THE INVENTION

In one aspect of the invention, a gas turbine engine including a core engine, a nacelle surrounding at least a portion of the core engine, and a bypass duct defined by and between the nacelle and the core engine, further defining a fore-to-aft air flow conduit. The gas turbine engine further includes a cascade element within the nacelle. The gas turbine engine further includes a blocker door, movable between a stowed position where the blocker door closes the cascade element to the air flow conduit, and a deployed position, where the blocker door opens the cascade element to the air flow conduit and extends into the air flow conduit to deflect air through the cascade element. An actuator, mechanically coupled between the blocker door and one of the nacelle and the core engine, selectively moves the blocker door between the stowed and deployed positions. A stop, located on the other of the nacelle and the core engine, at a position where the blocker door abuts the stop in the deployed position, wherein any aerodynamic loading on the blocker door is shared through the actuator and the stop.

According to a second aspect of the invention, a thrust reverser assembly for a gas turbine engine including a core engine, a nacelle surrounding at least a portion of the core engine to define a bypass duct between the nacelle and the core engine. The thrust reverser assembly further includes a cascade element located within the nacelle. A blocker door, movable between a stowed position, where the blocker door closes the cascade element to the air flow conduit, and a deployed position, where the blocker door opens the cascade element to the air flow conduit and extends into the air flow conduit to deflect air through the cascade element. The thrust reverser assembly further includes a first structure connection the blocker door to the nacelle when the blocker door is in the deployed position to define a first load path through which aerodynamic loading on the blocker door is transferred to the nacelle. A second structure, connecting the blocker door to the core engine when the blocker door is in the deployed position, defines a second load path through which aerodynamic loading on the blocker door is transferred to the core engine.

A method of carrying the aerodynamic loading on a blocker door of a thrust reverser for a gas turbine engine having a core engine surrounded by a nacelle to define a bypass duct, the method including, transferring a first portion of the aerodynamic loading along a first load path to the nacelle when the thrust reverser is actuated and the blocker door extends into and deflects air from the bypass duct, and transferring a second portion of the aerodynamic loading along a second load path, different than the first load path, to the core engine when the thrust reverser is deployed and the blocker door extends into and deflects air from the bypass duct.

DETAILED DESCRIPTION OF THE INVENTION

The described aspects of the present invention are directed to a thrust reverser assembly, particularly in a gas turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
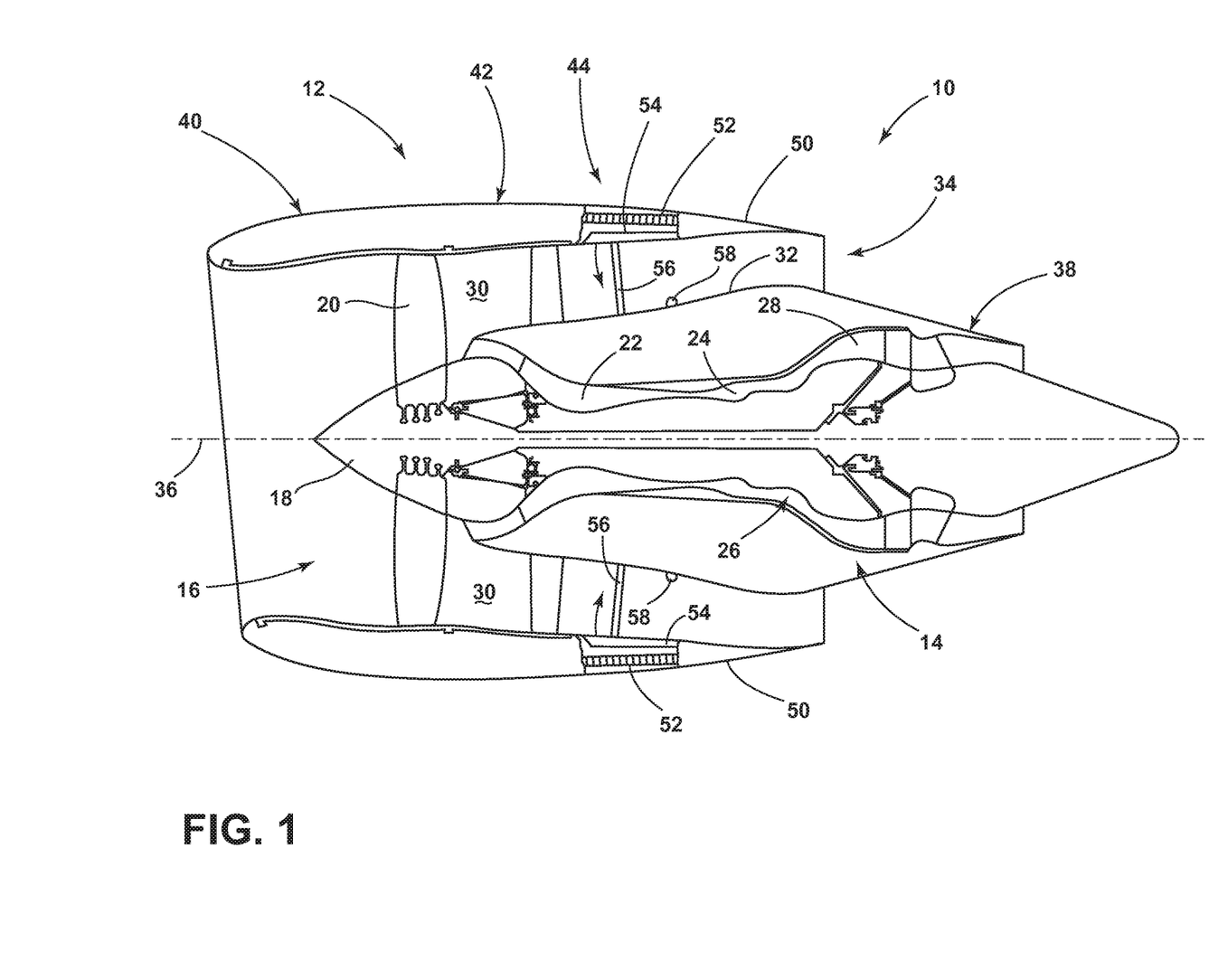
FIG. 1 is a schematic cross-sectional diagram of a gas turbine engine for an aircraft including a thrust reverser assembly with a stop according to an aspect of the invention.

FIG. 1 schematically represents a gas turbine engine illustrating a thrust reverser assembly shown as a high-bypass turbofan engine 10 of a type known in the art. The engine 10 is schematically represented as including a nacelle 12 and a core engine 14. The engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 32, and exits the bypass duct 30 through a fan exit nozzle 34. The inner core cowl 32 defines the radially inward boundary of the bypass duct 30, and provides a 32 transition surface to a primary exhaust nozzle 38 that extends aft from the core engine 14. The nacelle 12 defines the radially outward boundary of the bypass duct 30. The bypassed fan air flows through bypass duct 30 defined by the nacelle 12 and inner core cowl 32 before being exhausted through the fan exit nozzle 34.

The nacelle 12 is typically composed of three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42. The thrust reverser assembly 44 includes three primary components: a translating cowl 50 mounted to the nacelle 12, a cascade 52 schematically represented within the nacelle 12, and blocker doors 54 adapted to be pivotally deployed from stowed positions shown in FIG. 1 as radially inward from the cascade 52. The inner core cowl 32 of the core engine 14 is also part of the thrust reverser assembly 44, and the fore end of the blocker door 54 is pivoted into engagement with the inner core cowl 32 when the blocker door 54 is fully deployed. The inner core cowl 32 can be disposed with a set of stops 58 protruding into the bypass duct 30. The cascade 52 is a fixed structure of the nacelle 12, whereas the translating cowl 50 is adapted to be translated aft to expose the cascade 52 and deploy the blocker door 54 into the bypass duct 30, causing bypassed air within the bypass duct 30 to be diverted through the exposed cascade 52 and thereby provide a thrust reversal effect. While two blocker doors 54 are shown in FIG. 1, a set of blocker doors 54 are typically circumferentially spaced around the nacelle 12.

Figure 2:
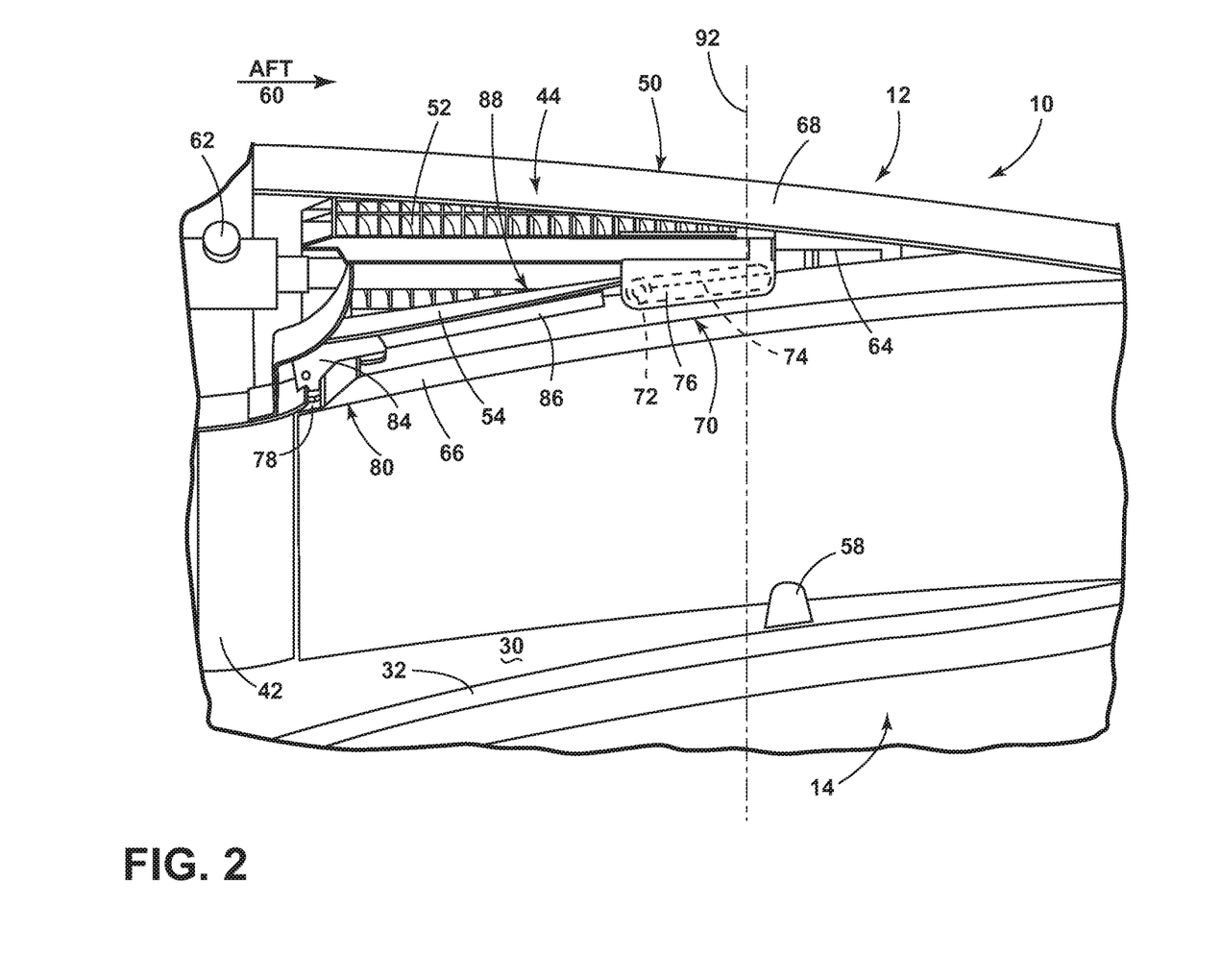
FIG. 2 is an isolated sectional view of the thrust reverser assembly of FIG. 1 in the stowed position.
Figure 3:
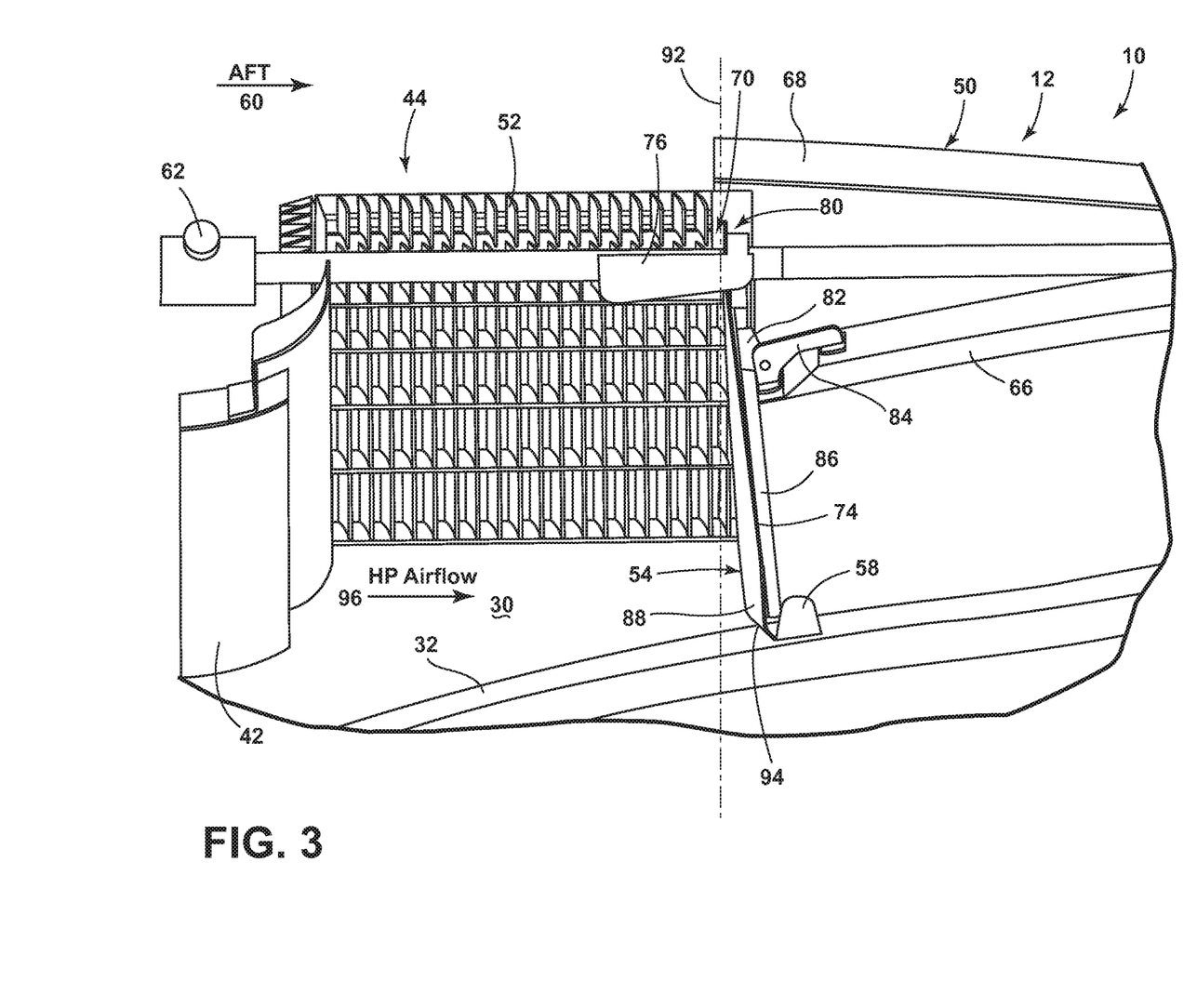
FIG. 3 is an isolated sectional view of the thrust reverser assembly of FIG. 1 in the deployed position.

FIGS. 2 and 3 show close-up view of the thrust reverser assembly 44 in the stowed and deployed positions, respectively. The blocker door 54 is adapted to deploy from a stowed position, shown in FIG. 2 as radially inward of the cascade 52, to a fully deployed position shown in FIG. 3. Whereas the cascade 52 is an element of the fixed structure of the nacelle 12, meaning that the cascade 52 does not move during the operation of the thrust reverser assembly 44, the translating cowl 50 is adapted to be translated in the aft direction 60 of the engine 10 to expose the cascade 52 and deploy the blocker door 54 into the bypass duct 30. An actuator 62 is mounted within the nacelle 12. The actuator 62 can be of any suitable type known in the industry.

Translation of the translating cowl 50 in the aft direction 60 by the actuator 62 causes the blocker door 54 to be deployed into the bypass duct 30, abutting the stop 58, as shown in FIG. 3. From FIG. 3, it can be appreciated that, when fully deployed, the blocker door 54 extends across the entire radial width of the bypass duct 30 and causes bypassed air within the bypass duct 30 to be diverted through the exposed cascade 52 and thereby provide a thrust reversal effect. Prior to translation of the translating cowl 50 (e.g., while the thrust reverser assembly 44 is not in use), the stowed blocker door 54 is positioned radially inward of the cascade 52, and both the cascade 52 and blocker door 54 are completely concealed by the translating cowl 50. More particularly, the cascade 52 and blocker door 54 are contained within a cavity 64 defined between radially inner and outer walls 66 and 68 of the translating cowl 50, such that the radially inner wall 66 of the translating cowl 50 completely separates the cascade 52 and blocker door 54 from the bypass duct 30. As such, the inner wall 66 of the translating cowl 50 defines a portion of the radially outer flow surface of the bypass duct 30. As such, the blocker door 54 does not define any portion of the radially outer flow surface of the bypass duct 30 during normal engine operation, and therefore does not create surface interruptions (gaps and steps) or cause duct leakage. Furthermore, the blocker door 54 is not exposed to damage and wear-inducing conditions during normal in-flight engine operations. Another advantage is that the entire inner wall 66 of the translating cowl 50 can incorporate an uninterrupted acoustic treatment (not shown) of its entire surface area to promote increased engine noise attenuation.

In the deployed position, best seen in FIG. 3, the stop 58 can mount to the inner core cowl 32 or can be structurally integral with the inner core cowl 32, extending into the bypass duct 30 radially from the centerline 36. The stop 58 is disposed on the inner core cowl 32 aft of a roller and guide track assembly 70, such that a radial axis 92, being normal to the centerline 36 and passing through the aft end of the roller and guide track assembly 70, is forward of the stop 58.

The stop 58, can be a cylinder shape with a rounded top, however any geometry is contemplated. Exemplary geometries can include a geometry which minimizes aerodynamic drag within the bypass duct 30 or provides an optimal surface on which the blocker door 54 abuts the stop 58 in the deployed position, such as a seat defined in the stop 58 on which an end 94 of the blocker door 54 can rest. One further exemplary geometry can include an airfoil shape. Additionally, it is contemplated that multiple stops 58 can be used with a single blocker door 54 or an elongated, annular stop, disposed partially or wholly around the inner core cowl 32, for example, can be used with multiple blocker doors 54. It should be understood that the stop 58 can be constructed of various materials, including metallic, plastic, rubber, and composite materials commonly used in aerospace applications or any other material adapted for the shock or wear associated with bearing dynamic loads, relative motion, or pre-load capabilities. The stop can also be fabricated by machining, casting, molding, lamination, etc., and combinations thereof. The stop 58 can be mechanically attached or formed integral to the inner core cowl bondment design.

The blocker door 54 is shown as being coupled to the fixed structure of the nacelle 12, the cascade 52, as well as coupled to the translating cowl 50, and the inner wall 66. Two degrees of freedom are allowed on the aft end of the blocker door 54 allowing the blocker door 54 to rotate and move in the fore and aft directions relative to the cascade 52. The connection between the blocker door 54 and inner wall 66 of the translating cowl 50 is shown as a rotating connection, which supports a slider (not shown) mounted to a track assembly 70 on the rear side of the blocker door 54. As the translating cowl 50 deploys aft, the rotating pivot 84 travels along the blocker door guide track 76 and guides the blocker door 54 into the bypass fan duct 30. As the translating cowl 50 translates aft, the cascades 52 are exposed. The blocker door 54 re-diverts bypass airflow through the cascade 52 in the forward direction, providing reverse thrust.

The rotating and sliding joints of the blocker door 54 are preferably geometrically and physically designed to provide a desired sequence and rate of deployment for the blocker doors 54. In the deployed position, multiple blocker doors 54 can be configured to interface together to yield a desired percentage of duct blockage, which can be further optimized by seals provided along the edges of the blocker doors 54.

In FIG. 3, the translating cowl 50 has been translated in the aft direction 60, being pushed by the actuator 62, such that the cascade 52 is exposed and the blocker door 54 is deployed. In the deployed position, the blocker door 54 abuts the stop 58 on the trailing end 74 of the blocker door 54. The blocker door 54, pivoting at a pivoting assembly 80, extends beyond the radial axis 92 such that the longitudinal orientation of the blocker door 54 now defines an obtuse angle relative to the cascade 52.

In the deployed position, the blocker door 54 abuts the stop 58 and a high pressure (HP) airflow 96 moves through the bypass duct 30 in an aft direction. The HP airflow 96 presses against the blocker door 54 with a force, creating a load determined by the airflow pressure and the surface area of the blocker door 54. The load can be at least partially borne by the stop 58, whereas the load would normally be transferred to the translating cowl bondment and then to the actuator 62 coupled to the blocker door 54. Additionally, the load can be shared by the inner core cowl 32 and the core engine 14, better adapted to bear the load. Thus, the load created by the force of the high pressure airflow 96 on the actuator 62 is reduced in relation to the load borne by the stop 58.

Figure 4:
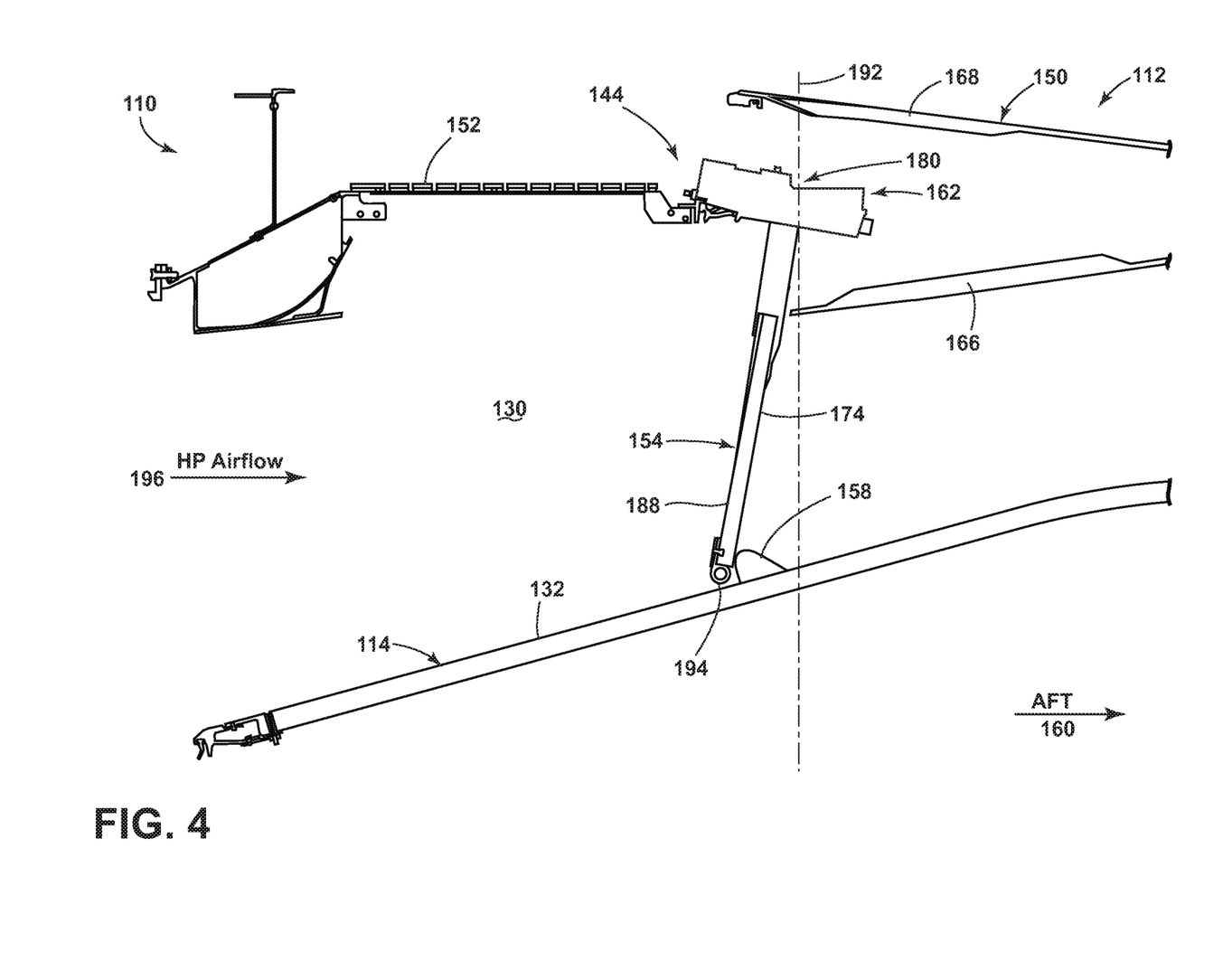
FIG. 4 is an isolated sectional view of a thrust reverser assembly including a stop according to another aspect of the invention.
Figure 5:
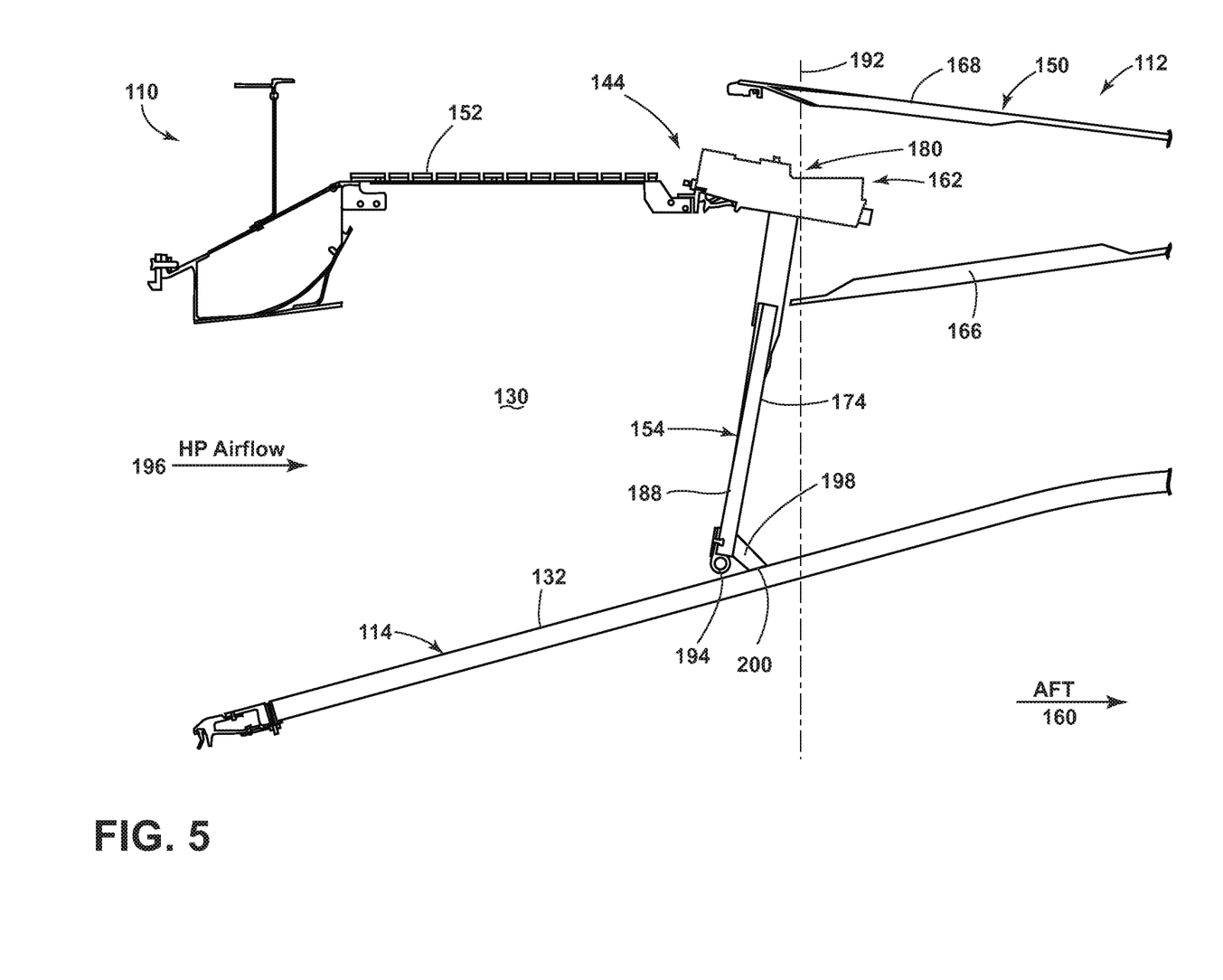
FIG. 5 is an isolated sectional view of the thrust reverser assembly of FIG. 4 with the stop mounted to a blocker door.

Turning now to FIGS. 4 and 5, a thrust reverser assembly is shown according to a second aspect of the invention. Elements of the second aspect are similar to the elements first aspect and numerals increased by 100 will be used to identify the similar elements. In FIG. 4, an engine 110 includes a nacelle 112 and a core engine 114 with a high-pressure turbine. A bypass duct 130 is defined between the nacelle 112 and an inner core cowl 132 enclosing the high-pressure turbine 126. The nacelle 112 further includes a thrust reverser assembly 144 substantially within the nacelle 112.

A translating cowl 150, further defining the nacelle 112, is shown translated in the aft direction 160. The translating cowl 150 further includes an inner wall 166 and an outer wall 168, being relative to the radial center of the engine 110. The translating cowl 150, prior to translation in the aft direction 160, encloses the thrust reverser assembly 144. The thrust reverser assembly 144 includes a cascade 152, a blocker door 154, and an actuator system 162 coupled to a pivoting assembly 180. A stop 158 mounted to the inner core cowl 132 is also a part of the thrust reverser assembly 144, adapted to receive the deployed blocker door 154. The blocker door 154 further includes a leading end 188 for receiving a high-pressure (HP) airflow 196 and a trailing end 174 opposite of the leading end 188. The blocker door 154 additionally includes a longitudinal end 194 extending opposite of the pivoting assembly 180.

During deployment of the thrust reverser assembly 144, the translating cowl 150 is translated in the aft direction 160 deploying the blocker door 154 into the position shown in FIG. 4. A radial axis 192 extends radially through the pivoting assembly 180, being normal to the engine centerline. The stop 158 is mounted on the inner core cowl 132 forward of the radial axis 192. In the deployed position, the blocker door 154 abuts the stop 158 such the blocker door 154 defines an acute angle relative to the cascade 152. With the blocker door 154 disposed forward of the radial axis 192, a greater amount of airflow can be diverted through the cascade 152, increasing the rate of thrust reversal and the efficiency of the thrust reverser assembly 144. Additionally, an increased load from the HP airflow 196 can push against the blocker door 154 as the stop 158 and the inner core cowl 132 bear a significant portion of the load translated from the blocker door 154. Thus, an increased load can be borne by the thrust reverser assembly 144 and increase the effectiveness of the thrust reverser assembly 144. Alternatively, a smaller load is borne by the actuation system 162, providing for a smaller, lighter actuation system 162 without sacrificing initial effectiveness of the thrust reverser assembly.

Turning to FIG. 5, the thrust reverser assembly 144 is shown with an alternate stop 198 mounted to the blocker door 154 in accordance with the second aspect of the invention. The stop 198 can mount to the blocker door 154 or can be integrally constructed with the blocker door 154, such that the stop 198 is hidden within the translating cowl 150 when the thrust reverser assembly 144 is in the stowed position, eliminating any aerodynamic drag can occur when the stop is mounted on the inner core cowl 32. The stop 198 mounts to the trailing end 174 of the blocker door 154, near the longitudinal end 194, and can be shaped with a seat 200 such that a surface area of the seat 200 abuts the inner core cowl 132. The seat 200 allows a greater load translation through the stop 198 to the inner core cowl 132.

When deployed, the stop 198 abuts the inner core cowl 132 such that the blocker door 154 cannot extend beyond the radial axis 192, typically defining an acute angle relative to the engine centerline 36. In an alternative aspect, the stop 198 can be disposed on the longitudinal end 194 of the blocker door 154, or the leading end 188. Additionally, the stop 198 can interface with a sub-flush feature on the inner core cowl 132.

During deployment, the stop 198, as well as the inner core cowl 132, bears the load created by the HP airflow 196 against the blocker door 154, reducing the load translated to the actuation system 162. The load borne by the blocker door 154 is translated through the stop 198 to the inner core cowl 132, permitting the use of a smaller actuation system 162. Additionally, a larger more efficient blocker door 154 can be utilized without increasing the size of the actuation system 162.

It should be appreciated that the operation of the blocker doors and their guided and rotating connections are not dependent on any particular type of cascade design, and in fact the invention could be installed in a non-cascade reverser design in which the bypassed air is diverted from the bypass duct through openings of various configurations.

Furthermore, whereas the blocker door is shown with a rigid construction that does not intentionally bend, flex or fold during its deployment, blocker doors having any of these capabilities are also within the scope of the invention. It should be further understood that an extended length blocker door or folding door that extends as it is deployed can be utilized to provide a blocker door that, when deployed, is capable of extending into the external air flow to provide additional retarding drag. Finally, it should also be appreciated that the thrust reverser assembly and its individual components can be constructed of various materials, including metallic, plastic and composite materials commonly used in aerospace applications and fabricated by machining, casting, molding, lamination, etc., and combinations thereof.

In any of the above various aspects, a protective coating, such as a thermal barrier coating, or multi-layer protective coating system can be applied to the cowls or engine components. The various aspects of systems, methods, and other devices related to the invention disclosed herein provide an improved thrust reverser assembly, particularly in a fan cowl. Conventional thrust reverser assemblies utilize a blocker door coupled to an actuation system. However, the actuation system must have enough structural integrity to support the load created by the force of the airflow against the blocker door as it opens within the bypass duct, requiring a larger actuation system. By utilizing a stop on the inner core cowl or on the blocker door, the load is transferred to the stop or the core engine. As such, a smaller load is borne by the actuation system, allowing a lighter, smaller actuation system, decreasing the weight of the system and creating additional room within the nacelle structure.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine, comprising:
    a core engine;
    a nacelle surrounding at least a portion of the core engine;
    a bypass duct defined by and between the nacelle and the core engine and defining a fore-to-aft air flow conduit;
    a cascade element located within the nacelle;
    a blocker door movable between a stowed position, where the blocker door closes the cascade element to the air flow conduit, and a deployed position, where the blocker door opens the cascade element to the air flow conduit and a longitudinal end of the blocker door extends into the air flow conduit to deflect air through the cascade element;
    an actuator mechanically coupled between the blocker door and the nacelle and configured to selectively move the blocker door between the stowed position and the deployed position; and
    a stop located on the core engine at a position where the longitudinal end of the blocker door abuts the stop in the deployed position, wherein any aerodynamic loading on the blacker door is shared through the actuator and the stop, and the stop protrudes into the bypass duct when the blocker door is in the stowed position.

2. The gas turbine engine of claim 1 wherein the core engine includes a casing and the stop is located on the casing.

3. The gas turbine engine of claim 1 wherein the stop extends at least partially about a circumference of the core engine.

4. The gas turbine engine of claim 3 wherein the stop includes a single element.

5. The gas turbine engine of claim 3 wherein the stop includes multiple, spaced elements.

6. The gas turbine engine of claim 1 wherein the blocker door and the stop are included in multiple pairs of blocker doors and stops radially spaced about the core engine.

7. The gas turbine engine of claim 1 wherein the stop is disposed on the core engine aft of a roller and guide track assembly and a radial axis that is normal to a centerline of the core engine and that passes through an aft end of the roller and guide track assembly is forward of the stop.

8. A thrust reverser assembly for a gas turbine engine including a core engine, a nacelle surrounding at least a portion of the core engine to define a bypass duct between the nacelle and the core engine, comprising:
    a cascade element located within the nacelle;
    a blocker door movable between a stowed position, where the blocker door closes the cascade element to the bypass duct, and a deployed position, where the blocker door opens the cascade element to the bypass duct and extends into the bypass duct to deflect air through the cascade element;
    a first structure connecting the blocker door to the nacelle when the blocker door is in the deployed position to define a first load path through which aerodynamic loading on the blocker door is transferred to the nacelle; and
    a second structure on the core engine abuts a longitudinal end of the blocker door when the blocker door is in the deployed position to define a second load path through which aerodynamic loading on the blocker door is transferred to the core engine, the second structure protruding into the bypass duct when the blocker door is in the stowed position.

9. The thrust reverser assembly of claim 8 wherein the first structure includes an actuator mechanically coupled between the blocker door and the nacelle and selectively moving the blocker door between the stowed and the deployed positions.

10. The thrust reverser assembly of claim 9 wherein a second end of the actuator, opposite a first end, is mounted to the nacelle.

11. The thrust reverser assembly of claim 8 wherein the second structure comprises a stop located on the core engine at a position where the blocker door abuts the stop in the deployed position.

12. The thrust reverser assembly of claim 11 wherein the core engine includes a casing and the stop is located on the casing.

13. The thrust reverser assembly of claim 11 wherein the stop extends at least partially about the circumference of the core engine.

14. The thrust reverser assembly of claim 11 wherein the stop includes a single element.

15. The thrust reverser assembly of claim 11 wherein the stop includes multiple, spaced elements.

16. The thrust reverser assembly of claim 11 wherein the blocker door and the stop are included in multiple pairs of blocker doors and stops radially spaced about the core engine.

17. A method of carrying aerodynamic loading on a blocker door of a thrust reverser for a gas turbine engine having a core engine surrounded by a nacelle to define a bypass duct, the method comprising:

transferring a first portion of the aerodynamic loading along a first load path to the nacelle when the thrust reverser is actuated and a longitudinal end of the blocker door extends into and deflects air from the bypass duct, the first load path including an actuator; and     transferring a second portion of the aerodynamic loading along second load path, different than the first load path, to the core engine when the thrust reverser is actuated and the blocker door extends into and deflects air from the bypass duct, the second load path including a stop mounted on the core engine at a position where the longitudinal end of the blocker door abuts the stop in a deployed position, and the stop protrudes into the bypass duct when the thrust reverser is not actuated.

18. The method of claim 17 wherein the first load path passes through the actuator mechanically coupling the blocker door to the nacelle.

\* \* \* \* \*